United States Patent
Henry

(10) Patent No.: US 10,994,881 B2
(45) Date of Patent: May 4, 2021

(54) METHOD FOR PACKAGING A SPECTACLE LENS

(71) Applicant: ESSILOR INTERNATIONAL, Charenton-le-Pont (FR)

(72) Inventor: Patrick Henry, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 401 days.

(21) Appl. No.: 16/061,150

(22) PCT Filed: Dec. 8, 2016

(86) PCT No.: PCT/FR2016/053280
§ 371 (c)(1),
(2) Date: Jun. 11, 2018

(87) PCT Pub. No.: WO2017/098168
PCT Pub. Date: Jun. 15, 2017

(65) Prior Publication Data
US 2020/0262163 A1    Aug. 20, 2020

(30) Foreign Application Priority Data
Dec. 10, 2015 (FR) ...................................... 1562110

(51) Int. Cl.
| | |
|---|---|
| B65B 61/22 | (2006.01) |
| B65D 85/38 | (2006.01) |
| B65D 81/05 | (2006.01) |
| B65B 25/00 | (2006.01) |
| B29D 11/00 | (2006.01) |
| G02B 1/10 | (2015.01) |
| G02C 7/02 | (2006.01) |
| A45C 11/00 | (2006.01) |

(52) U.S. Cl.
CPC .............. *B65B 61/22* (2013.01); *B65B 25/00* (2013.01); *B65D 81/05* (2013.01); *B65D 85/38* (2013.01);
(Continued)

(58) Field of Classification Search
CPC .............. A45C 11/005; B65D 85/38; B65D 2585/545; B65D 81/05; B65B 25/008; B65B 61/22; B29D 11/00567
(Continued)

(56) References Cited

U.S. PATENT DOCUMENTS 2,180,887 A * 11/1939 Tillyer ................ G02C 7/02
                                              351/159.52
2,339,584 A *  1/1944 Rice ............................ 426/396
(Continued)

FOREIGN PATENT DOCUMENTS

| DE | 10 2013 019 921 | 11/2014 |
|---|---|---|
| EP | 2 275 360 | 1/2011 |

(Continued)

OTHER PUBLICATIONS

International Search Report, PCTFR2016/053280, dated Feb. 15, 2017.
French Search Report, FR 1562110, dated Aug. 11, 2016.

*Primary Examiner* — Stephen F. Gerrity
*Assistant Examiner* — Joshua G Kotis
(74) *Attorney, Agent, or Firm* — Nixon & Vanderhye

(57) ABSTRACT

Disclosed is a method for packaging an optical lens including two faces and a peripheral edge, at least one of the faces having a convexity marked by a peak point, the method including the following steps: a step of depositing a protective strip made from a rigid material at least partially along the edge, the width of the strip extending beyond the peak point of the convex face of the lens; a step of inserting the lens into an envelope delimited by a wall; a step of positioning the lens in the envelope, such that the protective strip acts as a spacer in order to maintain a distance between the wall of the envelope and the convex face of the lens and thus preventing any contact between the wall and the face.

15 Claims, 3 Drawing Sheets

(52) U.S. Cl.
CPC ....... *A45C 11/005* (2013.01); *B29D 11/00567* (2013.01); *B29D 11/00865* (2013.01); *B65B 25/008* (2013.01); *B65D 2585/545* (2013.01); *G02B 1/10* (2013.01); *G02C 7/02* (2013.01)

(58) Field of Classification Search
USPC ......... 53/410, 411, 415, 255; 206/5.1, 316.1
See application file for complete search history.

(56) References Cited

U.S. PATENT DOCUMENTS

| | | | |
|---|---|---|---|
| 5,454,469 A | 10/1995 | Budny et al. | |
| 8,028,827 B2 * | 10/2011 | Balix | B65D 85/38 |
| | | | 206/5.1 |
| 2006/0213783 A1 * | 9/2006 | Tokarski | A45C 11/005 |
| | | | 206/5.1 |
| 2015/0122671 A1 * | 5/2015 | Newman | B32B 3/08 |
| | | | 206/205 |

FOREIGN PATENT DOCUMENTS

| | | | | |
|---|---|---|---|---|
| FR | 2 913 006 | | 8/2008 | |
| JP | 10 59453 | | 3/1998 | |
| JP | 11 11562 | | 1/1999 | |
| JP | H1111562 A | * | 1/1999 | ............. B65D 85/38 |
| JP | 2007-99313 | * | 4/2007 | ............. B65D 81/20 |
| JP | 2007-099313 | | 4/2007 | |
| NL | 8 700 276 | | 9/1988 | |
| WO | WO-9424004 A1 | * | 10/1994 | ........... B65D 5/2009 |

\* cited by examiner

METHOD FOR PACKAGING A SPECTACLE LENS

BACKGROUND OF THE INVENTION

Field of the Invention

The invention relates to a method of packaging a spectacle lens. To be more specific, packaging of this kind is designed to facilitate the transportation and the manipulation of the lens.

Description of the Related Art

As a general rule, a lens intended to be mounted in a spectacle frame will inevitably undergo a transportation phase, either to be sent to a workshop where it will be machined in a more refined manner in order to be directly ready to be fixed to the appropriate frame, or if it has already been machined to be sent for example to an optician, who will then proceed to fix it to said frame.

This transportation phase is made delicate because these lenses have often undergone a surface treatment, for example to prevent reflections and/or to favor a flow of water, said treatment being sensitive to any type of exterior contact. Accordingly, contact with the fingers of a hand or with the wall of transportation packaging can rapidly degrade this surface treatment and render the lens unusable.

A first solution enabling transportation of this type of lens whilst protecting it from exterior contact consists in placing it as such in a flexible and lightweight envelope. Once inserted in the envelope, the lens is in contact with said envelope. Now, it has turned out that the lens was caused to move in said envelope, causing rubbing liable to degrade the surface treatment of said lens.

In order to remedy this harmful rubbing, a second solution consists in placing a protective film, for example of foam, on the internal surface of the wall of the envelope in order to soften the conditions of contact between the lens and the wall of the envelope, and therefore to limit the deterioration of the surface treatment of the lens. Now, the placement of such a film increases the packaging costs and does not prevent a person wishing to extract the lens from the envelope from leaving fingerprints on the lens that can degrade the surface treatment of the lens.

A third solution, used alone or in combination with one of the previous ones, consists in applying a protective pad, for example a flexible plastic film, directly to the lens in order to protect the treated surface. Now, to be fully effective, this protective pad must preferably be centered on said surface. The result of this is a high additional cost caused by the cost of this pad as well as that of the time to apply it, without omitting the condition that it is not compatible with lenses that require the deposition beforehand of marking ink.

A fourth solution has been to create rigid packaging, the dimensions of which are adapted to those of the lens, and the geometry of which prevents any contact of the lens with the wall of the packaging. Now, the manufacture of rigid packaging of this kind is costly, and each form of packaging is often adapted to only one lens size and geometry, obliging the manufacture of different packaging for each type of lens encountered.

BRIEF SUMMARY OF THE INVENTION

A method in accordance with the invention of packaging a lens enables transportation and manipulation of said lens whilst preserving the state of its surfaces, whilst circumventing the disadvantages encountered in the prior art.

The invention consists in a method of packaging an optical lens including two faces and a peripheral edge, at least one of said faces having a convexity marked by a peak point.

The principal feature of a packaging method according to the invention is that it comprises the following steps,
  a step of depositing a rigid material protective strip at least partially along said edge, the width of the strip extending beyond the peak point of the convex face of the lens,
  a step of inserting the lens in an envelope delimited by a wall,
  a step of placing said lens in said envelope so that the protective strip serves as a spacer in order to maintain a distance between the wall of the envelope and the convex face of said lens and thus to prevent any contact between said wall and the face.

The object of this rigid strip is to produce a distance between the wall of the envelope and the convex face of the lens, in order to prevent direct contact between said wall and said convex face of the lens. Actually, in the absence of this protective strip there is nothing to prevent the wall of the envelope from coming into contact with the convex face of the lens, with a high risk of degrading the surface state of said convex face. The protective strip pushes the wall of the envelope away in order to prevent it from interfering with the convex face of the lens. This strip also serves as a holding member for a person wishing to manipulate the lens, preventing fingerprints on the lens, liable to affect the surface of the lens. It is important to emphasize that this strip has no particular function linked to the lens, and is only temporarily present on the lens, preferably during a phase of transportation and/or of manipulation. The placing of this strip against the lens is reversible, said strip being removable at any time. The rigid strip is preferably applied manually without requiring the use of any particular tool. The strip must remain rigid in the event of usual daily handling, but does not call for manufacture in a material having a high mechanical strength, such as for example metal or carbon fiber, specifically designed to resist high forces. Assuming that the lens has a base plane having the shape of the contour of the lens, or corresponding to the plane on which the lens may be placed in a stable manner with the concave face oriented toward said plane, the peak point of the convex face of said lens is situated in line with the center of this plane. The strip is therefore placed around the lens and the width of the strip represents its dimension in a direction perpendicular to said base plane. It is preferably assumed that the width of the strip is constant around the lens. The strip advantageously adheres to the lens by being glued on. The lens preferably has a circular contour and the strip is like a hollow cylinder. It must be specified that the strip covers at least partially the peripheral edge of the lens over the width of said lens. The envelope may for example be made from a cellulose-based material, such as paper or cardboard for example, or a polymer. A packaging method of this kind may for example be completed by a step of closing the envelope containing the lens.

According to one embodiment of the invention, the lens is a finished lens that can be mounted on a spectacle frame with no transformation other than machining the contour.

In one particular application of the invention, the lens includes on its convex face a layer sensitive to abrasion such as a hydrophobic coating, an oleophobic coating, a protective layer for a coating of this kind or a non-permanent ink marking, said marking being intended to be removable by rubbing.

The packaging method according to one embodiment of the invention comprises, a step of depositing a strip of glue along the edge, and
a step of application of the protective strip against said edge to attach it thereto by gluing it.

These two steps are separate, the step of depositing glue preceding the step of application of the strip against the edge. The strip of glue along the peripheral edge may be continuous or discontinuous.

The packaging method according to another embodiment of the invention comprises, a step of unwinding an adhesive protective strip from a roll,
a step of application of the protective strip as it is unwound against the edge of the lens to attach said strip to said edge.

These two steps are for example simultaneous. A method comprising these two steps is rapid and easy to carry out by in particular dispensing with a step of depositing glue.

The protective strip preferably extends over at least ⅔ of the total length of the peripheral edge. To serve effectively as a spacer between the lens and a wall of potential packaging, the coverage of the contour of the lens by the strip must be large, in order to avoid leaving a large gap around said contour with no spacer, which would allow a portion of the wall of the envelope to come into contact with the convex face of the lens. In one particular example, the protective strip extends over at least ⅔ of the total length of the peripheral edge without extending over the totality of the total length of the peripheral edge.

Alternatively, the protective strip extends over the totality of the length of the peripheral edge. A strip of this kind corresponds to an optimized configuration offering a comfortable grip for grasping the assembly consisting of the lens and said strip. Moreover, a protective strip of this kind definitely prevents any contact of the wall with the convex face of the lens.

The two ends of the protective strip advantageously overlap, increasing the mechanical strength of said strip. Actually, at the level of the zone of overlap of the two ends, the thickness of the strip is doubled, increasing the stiffness of the strip.

In one embodiment of the invention, the two ends of the protective strip overlap, and can for example form an overlap over at least 1 cm, preferably over at least 2 cm, reinforcing the mechanical strength of said strip.

According to a variant of this embodiment of the invention, the protective strip includes before deposition a support film including an adhesive face and a second face covered with a layer able to be peeled off and weakly adhering to the adhesive face, the protective strip being deposited by application of the adhesive face to the lens. Said layer able to be peeled off is then removed at the time of deposition so that the overlap occurs directly between a portion of the adhesive face and the second face of the support film.

In another non-exclusive variant of this embodiment of the invention, the protective strip is at least partially elastic and is tensioned when it is deposited around the peripheral edge of the lens or comes to adhere to the edge of the lens by simply tensioning it, said strip having two overlapping ends that can be fixed to one another. In other words, the protective strip is pulled around the peripheral edge of the lens, being correctly placed on said edge without forcibly necessitating the use of any adhesive material. The two ends of said strip are then fixed to one another by any means when the strip is still under tension around the edge of the lens. The closure of the strip by close cooperation between the two ends suffices to retain the protective strip around the lens in a stable and robust manner. For example, the strip can stick to itself. This embodiment makes it possible for example to dispense with adhesion of the protective strip to the edge of the lens. However, this embodiment may be combined with the use of an adhesive between the protective strip and the edge of the lens, for example when the lens is a finished lens with a very thin peripheral edge, in particular an edge less than 2 mm thick, or less than 1 mm thick or even less than 0.5 mm thick. The combination of the use of an adhesive and of the elastic tensioning of the strip makes it possible to ensure stable and robust retention despite a very small thickness of the edge.

In one particular embodiment, the tensioning of the strip causes slight plastic deformation of the protective strip.

Alternatively, the protective strip takes the form of at least three discontinuous segments regularly spaced along said edge. Actually, it is not necessary for the strip to be continuous around the lens to serve effectively as a spacer between the wall of the envelope and the convex face of the lens. It may take the form of at least three segments and it suffices for the spacing between two successive segments with no spacer not to be too large to prevent the wall of the envelope from coming into contact with the convex face of the lens. The segments may be separate or joined together by means of a strip of material whose width is less than that of said segments.

The protective strip preferably extends beyond the peak point by a distance of at least 1 mm.

The protective strip advantageously extends beyond the peak point by a distance between 2 mm and 5 mm inclusive and preferably between 3 mm and 5 mm.

The protective strip is advantageously deposited by gluing it to the edge of the lens, the width of the strip of glue extending over at least 2 mm on the width of the edge, except to cover all the width of the edge of the lens for a thickness of the edge of the lens at least locally less than 2 mm.

The width of the strip of glue along the edge advantageously extends at least partially over all the width of said edge, the width of said edge corresponding to the thickness of the lens.

According to one embodiment of the invention, the width of the protective strip in contact with the peripheral edge is less than 7 mm, preferably less than 5 mm. Actually, it is not necessary that the glue intended for the protective strip extend over all the width of the peripheral edge of the lens, because said glue merely serves to fix the protective strip around the lens temporarily.

The width of the strip of glue preferably extends over all the width of the edge for a finished lens with an edge thickness less than 7 mm or 5 mm. The width of a finished lens is generally small, often less than 7 mm or than 5 mm, and for the protective strip to be fastened around said lens effectively and in a stable manner, it is necessary that the width of the strip of glue be as large as possible.

Alternatively, for a semi-finished lens to be reworked by machining its concave face in order to impart a predetermined prescription and to form a finished lens, and for a finished lens having a peripheral edge more than 5 mm or even 7 mm thick, the protective strip is not in contact over all the width of the peripheral edge. For example, the width of the peripheral edge is not in contact with the protective strip over 1 mm to 10 mm.

In one particular embodiment, the width of the strip of glue extends over less than half the width of the edge in the case of a semi-finished lens. The thickness of a semi-finished lens is generally large, often of the order of 7 to 20 mm, and it is then not necessary that the strip of glue is spread over the whole of the width of the peripheral edge of said lens.

The thickness of the strip of glue is advantageously greater than 1 mm.

The protective strip is advantageously a thin and rigid adhesive tape, made at least partially from a cellulose-based material and/or a plastic film. For example, the protective strip may be made of paper or cardboard. The plastic film may be either transparent or opaque, such as for example a thermoplastic film. The protective strip may therefore be a strip of adhesive tape.

Alternatively, the protective strip is made of polymer foam. That foam may be more or less dense as a function of the weight of the lens and the transportation and/or manipulation constraints encountered.

A packaging method according to the invention advantageously comprises a step of marking the protective strip. That marking may be effected either in the form of a bar code or of a QR code (two-dimensional code) that can be read by means of an appropriate electronic reader, either in the form of a drawing and/or recognizable letters forming (or not) normal words. The bar code may for example embody some of the possible information concerning the lens: its source, its dimensions, its optical and dimensional characteristics, its date and place of manufacture, its batch number, etc. The drawing may for example represent a trademark. The letters may form a text giving all the information relating to the lens instead and in place of a bar code or a QR code.

The marking is preferably visible and preferably includes at least one distinctive sign representing a trademark. That mark may for example represent the company manufacturing or marketing the lens.

The marking advantageously includes at least one item of information serving to characterize the lens. That information may for example concern the source of the lens, its dimensions, its optical and dimensional characteristics, its date and place of manufacture, its batch number, etc.

A packaging method according to the invention is preferably reversible, the protective strip being removed manually to leave behind no trace linked to the presence of said protective strip against said edge. Actually, a packaging method according to the invention must be reversible in order to return the lens to the state it had before attaching the strip. A packaging method according to the invention is temporary and is merely carried out to address requirements linked to a phase of transportation and/or manipulation of the lens.

According to some variants, the protective strip has reinforced zones. Those reinforced zones may for example be provided by inserts disposed regularly along said strip. The inserts may be of cellulose-based material or plastic for example; they may be in the same material as the protective strip, thereby providing locally an additional thickness of the protective strip.

According to another embodiment, these reinforced zones are corrugated zones of the strip. In this way, these corrugated zones may be either continuous so that the protective strip is corrugated over all its perimeter or discontinuous so that these zones are regularly distributed along the strip. These corrugations may be formed by a loop of strip folded on itself so that there is no or little surface of the edge of the lens that is not in contact with the strip, or these corrugations may form an arc, for example as seen from above, such that a portion of the edge of the lens is locally deprived of direct contact with the strip. Then, the corrugations form zones in which the adhesive has a radius of curvature less than that of the lens, for example by a factor from 2 to 1000, for example from 10 to 500, or radii of curvature between 0.02 mm and 4 mm inclusive. These high-curvature and small radius of curvature zones create reinforcements having a high resistance to crushing relative to the protective strip in planar form and even relative to the protective strip arranged around the lens with a radius of curvature corresponding to that of the lens, i.e. between 1 cm and 4.5 cm according to whether the lens is edged to shape or not.

According to one embodiment, the envelope has two plane faces between which the lens is inserted so that each of said faces is face-to-face with a face of said lens, the arrangement between the protective strip and the lens preventing the face of the envelope facing the convex face of the lens coming into contact with said convex face of the lens. The arrangement between the protective strip and the lens is therefore preferably chosen to prevent the face of the envelope situated facing the convex face of the lens from coming into contact with said convex face of the lens, even if a pressure of at least 500 g or preferably at least 1 kg or more preferably at least 2 kg is applied to the face of the envelope.

The combination of the protective strip and its arrangement around the lens is advantageously chosen so that the resulting structure is capable of resisting a load of at least 1 kg. That resistance is measured by means of a calibrated test, the principal characteristics of which are specified hereinafter.

The protective strip is placed on the periphery of the lens. The structure formed by the lens and the protective strip is then placed on a rigid horizontal support and covered with a rigid plate enabling a load placed on the plate to be distributed over the whole of the circumference of the protective strip. A load of 800 g is placed at the center of the plate.

The behavior of the protective strip vis-à-vis this 800 g load is then observed, in particular to see if it is deformed, or to see if the plate comes into contact with the convex surface of the lens.

A load supported by the structure can thus be determined if the protective strip is not deformed and if the plate has not come into contact with the convex surface of the lens.

The load is then increased by increments of 200 g.

The structure according to the invention is therefore such that the load supported is at least approximately 1 kg, preferably greater than or equal to 2 kg, for example between 2 kg and 10 kg inclusive.

Another object of the invention is an assembly consisting of a lens and a protective strip for carrying out a packaging method in accordance with the invention.

In accordance with an embodiment in which the lens is finished and of small thickness or is semi-finished and of greater thickness, said lens having a convex face, the protective strip being deposited on the totality of the width of the peripheral edge of the lens if the lens is finished or on only a portion of the peripheral edge of the lens situated on the same side as said convex face if the lens is semi-finished so as to extend from the same side as the convex face and beyond the peak point of that face.

In one embodiment the strip is of elastomer, for example a foam, having a folded end and able to come to adhere to a face of the lens that is opposite the convex face. In this way, the folded end can itself be glued to the lens. This folded end has a very short length and preferably extends over less than 10% of the radius of the lens if the latter were circular, or less than 5% of the greatest dimension of said lens if the latter had some other shape.

A packaging method according to the invention has the advantage of being simple and rapid to carry out in that it necessitates no specific tooling and no complicated manipulation requiring precision. It has moreover the advantage of being reversible in as simple and rapid a manner, allowing return of the lens to its original state, without causing the slightest modification to appear at the level of its structure or its surface state. It finally has the advantage of being of relatively low cost because it requires the use of an adhesive strip necessitating no complicated dimensions.

BRIEF DESCRIPTION OF THE DRAWINGS

A detailed description of one embodiment of a method in accordance with the invention of packaging a lens is given hereinafter with reference to the following figures.

DETAILED DESCRIPTION OF THE PREFERRED EMBODIMENTS

Figure 1:
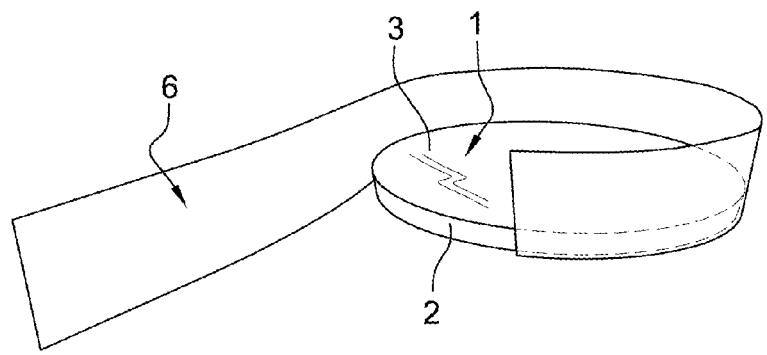
FIG. 1 is a simplified perspective view of a lens and a protective strip for the production of an assembly according to the invention.

In the following detailed description, it is assumed that a protective strip is fixed to an optical lens by gluing it on. Actually, a fixing technique of this kind is particularly suited to a packaging method according to the invention.

It is moreover understood that the term "lens" employed in the present description must be understood according to the following definition: the lens referred to here corresponds to an optical article of the ophthalmic lens type, an ocular visor, and optical viewing systems. In particular an ophthalmic lens is a lens that is designed to fit a spectacle frame in order to protect the eye and/or to correct the vision and may be a non-correcting ophthalmic lens (also termed a plano or an afocal lens) or corrective. A corrective lens may be a unifocal, bifocal, trifocal or progressive lens. The ophthalmic lens may be a finished lens or a semi-finished lens, intended to be reworked by machining one of its principal faces in order to impart a predetermined prescription, or an edged finished lens already embodying said predetermined prescription and having a contour with a shape adapted to be positioned in a frame.

Referring to FIGS. 1, 2, 3, 4 and 5, an optical lens 1 is of circular shape and delimited by:
a peripheral edge 2,
a convex face 3 having a central peak point 4, and
a plane or concave face 5, said peripheral edge 2 connecting said convex face 3 to said plane or concave face 5.

Figure 2:
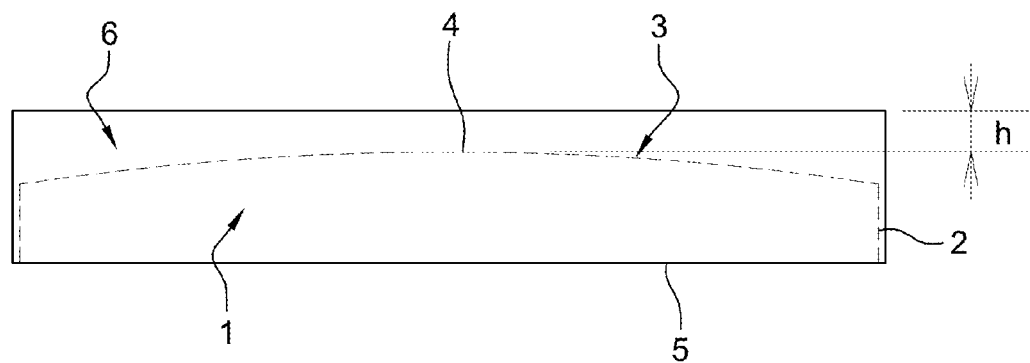
FIG. 2 is a simplified side view of an assembly according to a first embodiment of the invention consisting of a semi-finished lens and a protective strip.
Figure 3:
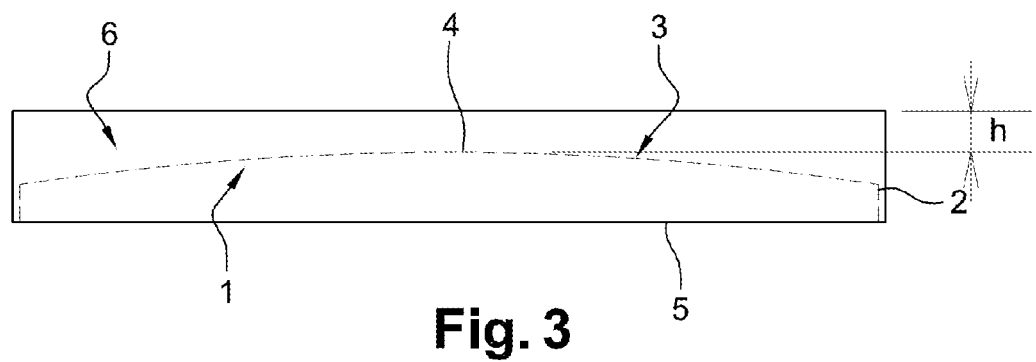
FIG. 3 is a simplified side view of an assembly according to a second embodiment of the invention consisting of a finished lens and a protective strip.

Referring to FIG. 2, the optical lens 1 may be semi-finished. It is a lens 1 that leaves the manufacturer with a peripheral edge 2 of large width. A lens 1 of this kind is intended to be machined with more refinement to impart a predetermined prescription and to become a finished lens in particular having a peripheral edge 2 of reduced width, as FIG. 3 shows. For information only, the finished lens 1 already embodies a predetermined prescription and is able to be mounted on a spectacle frame with no transformation other than machining the contour. The width of the peripheral edge 2 of the lens 1 is its dimension considered along the axis of revolution of said lens 1. Whether for a finished or semi-finished lens 1, this peripheral edge 2 has a cylindrical external surface. For a semi-finished lens 1 the width of the peripheral edge 2 may for example be of the order of 7 mm to 20 mm. In a finished lens 1 it is less than or equal to 7 mm or even to 5 mm.

A particular embodiment of the invention is intended for a lens 1 that includes on its convex face 3 a layer sensitive to abrasion such as a hydrophobic or oleophobic coating, a protective layer for a coating of that kind or a non-permanent ink marking, said marking being intended to be removable by rubbing. These layers are easily deteriorated during storage and transportation of packaged lenses if specific precautions are not taken; the method according to the invention advantageously makes it possible to protect such layers and to prevent them from deteriorating during storage or transportation of the lens.

Referring to FIG. 1, a packaging method according to a first embodiment of the invention comprises a step of gluing a protective strip 6 to all of the length of the peripheral edge 2 of the finished or semi-finished lens 1. This protective strip 6 is made from a cellulose-based material, for example paper or cardboard, only one face of which is adhesive, comprising for example a layer of adhesive material. In another embodiment, the protective strip 6 consists of a plastic film, such as a thermoplastic material film. Before being applied against the lens 1, this strip 6 is wound around a spool to form a roll. The face of the protective strip 6 that is not adhesive is covered here by a polymer film that may be transparent or not. This protective strip 6 advantageously includes a marking directly related to the lens 1 to which it adheres. This marking may for example represent a logo representing the company that manufactures the lens 1 or give the name of that company directly. It may equally give information relating to the lens 1, such as for example its source, its dimensions, its optical and dimensional characteristics, its date and place of manufacture, its batch number, etc. This marking may equally appear in the form of a bar code or a QR code (two-dimensional code), embodying all the above information. Applying an electronic reader to these various codes then makes it possible to have access to all this information. The protective strip must be light compared to the total weight of the lens 1 and it must be possible to manipulate it easily without using a tool and without particular precautions.

A packaging method according to the invention comprises a step of unwinding the roll of protective strip 6 and a simultaneous step of application of the adhesive face of said strip 6 against the peripheral edge 2 of the lens 1. This protective strip 6 has some rigidity, which renders it undeformable under the usual manual loads, such as for example picking it up or a slight accidental impact against a wall. On the other hand, this protective strip is not necessarily sized to resist high loads, as could for example a metal or carbon fiber protective strip. In particular, when the protective strip 6 is present on all of the perimeter of the lens 1, thus forming a cylinder, the rigidity of the structure formed in this way is increased relative to the inherent rigidity of the protective strip 6. Accordingly, in this case, the protective strip 6 requires only a rigidity such that the pseudo-cylindrical structure has a rigidity that is able to withstand a load of at least 1 kg evaluated in accordance with the method described below. It is therefore not necessary that the protective strip 6 alone have the rigidity necessary to withstand a load of at least 1 kg.

In other words, the combination of the protective strip 6 and its arrangement around the lens 1 is chosen so that the resulting structure is capable of resisting a load of at least 1 kg. That resistance is measured by means of a calibrated test, the principal characteristics of which are specified hereinafter.

The protective strip is placed on the periphery of the lens. The structure formed by the lens and the protective strip is then placed on a rigid horizontal support and covered with a rigid plate enabling a load placed on the plate to be distributed across the totality of the circumference of the protective strip. A load of 800 g is placed at the center of the plate.

The behavior of the protective strip vis-à-vis this 800 g load is then observed, in particular to see if it is deformed and if the plate comes into contact with the convex surface of the lens.

A load that the structure can withstand can therefore be determined if the protective strip is not deformed and if the plate does not come into contact with the convex surface of the lens.

The load is then increased by increments of 200 g.

The structure according to the invention is therefore such that the load it can withstand is at least approximately 1 kg, preferably greater than or equal to 2 kg, for example between 2 kg and 10 kg inclusive.

In all embodiments of the invention this protective strip 6 is such that, once stuck to the peripheral edge 2 of the lens 1, the width of said strip 6 is sufficient to be able to extend beyond the peak point 4 of the convex face 3 of the lens 1. Ideally, the protective strip 6 must extend beyond the peak point 4 of said convex face 3 by a distance h between 1 and 10 mm inclusive, preferably between 2 and 5 mm.

Referring to FIG. 3, if the lens 1 is finished and has a peripheral edge 2 of narrow width, for example less than 5 mm, the protective strip 6 is glued to all of the width of said edge 2. In other words, said strip 6 extends over all the width of the peripheral edge 2, becoming flush with the side of said edge 2 from which the plane face 5 or concave face of the lens 1 begins. This complete coverage of the peripheral edge 2 of the lens 1 by the protective strip 6 enables improvement of the conditions of contact between these two elements 2, 6 and some stability of the positioning of said strip 6 on said lens 1. Bad positioning of the protective strip 6 on the lens 1 could compromise the protective function of the strip 6 vis-à-vis the lens 1.

Referring to FIG. 2, if the lens is semi-finished, or if the finished lens has a high negative power (for example −6.00 D), and has a peripheral edge 2 of large width, for example of the order of 5 to 20 mm or 7 to 20 mm, it is not forcibly necessary that the protective strip 6 cover said peripheral edge 2 over the whole of its width. It suffices that the gluing surface between said strip 6 and said edge 2 has a width of at least 2 to 5 mm to ensure good stability of the positioning of the strip 6 on the lens 1. The portion of the peripheral edge 2 situated on the same side as the plane face 5 or the concave face therefore need not be covered by the protective strip 6, without this commensurately weakening the conditions of contact between the protective strip 6 and said peripheral edge 2.

Actually, the peripheral edge 2 of the lens 1, whether it is finished or semi-finished, having no optical function, thus need not forcibly receive any particular protection.

In the two examples shown in FIGS. 2 and 3, the protective strip 6 surrounds the lens 1 completely over all its periphery, in other words over 360°. It is possible for the two ends of this strip 6 to overlap to ensure 360° coverage of the lens 1. This overlap zone will have the benefit of a double thickness of strip 6 and will locally reinforce the rigidity of the protective strip 6 around the lens 1. Moreover, this overlap makes it possible to increase the overall rigidity of the protective strip by maintaining a closed cylindrical shape. To be fully effective, the protective strip must surround the lens 1 over at least ⅔ of the total periphery of said lens 1.

The overlap is then generally over at least 1 cm. For example the overlap may have a length between 1 cm and 5 cm inclusive, for example between 2 cm and 3 cm.

In accordance with one embodiment, the protective strip includes, before being used in the packaging method, a support film including an adhesive face and a second face covered with a layer able to be peeled off and weakly adherent to the adhesive face. The protective strip is then deposited by application of the adhesive face to the lens, said layer able to be peeled off being removed at the time of deposition so that the overlap occurs directly between a portion of the adhesive face and the second face of the support film.

According to one embodiment, the protective strip used is an adhesive strip of Bluedge© type and an adhesive strip of Advantedge© type distributed by Dac Vision®. In the case of the Bluedge® type protective strip, the structure of said protective strip is identical to that of the Bluedge® consumable product used in the ophthalmic industry for edging lenses.

The protective strip is applied around the lens without overlap or with an overlap less than 1 mm.

The assembly comprising the protective strip and the lens is then inserted into a flexible paper envelope.

In another embodiment, the protective strip includes a support film and a film able to be peeled off. The support film is partially elastic, with a tension force greater than 20 kN/m and a length before rupture greater than 100% of elongation in tension. The support film is a PET (polyethylene terephthalate) film 175 µm thick. The film able to be peeled off is a 32 µm PET film. The support film includes on the face not covered by the film able to be peeled off a layer of acrylic-based adhesive.

The protective strip has a width of 18 or 20 mm.

The lenses are finished lenses less than 7 mm thick. In particular, at least one lens 3.1 mm thick and one lens 0.5 mm thick.

During the deposition of the protective strip around the lens, the face including the adhesive is applied to the edge of the lens and a mechanical aid may be applied for the retention on the edge of the lens. The film able to be peeled off is removed during deposition. On application of the film around the lens, a tension of approximately 10 kN is applied and application continues around the lens until one end of the protective strip overlaps the other end by approximately 2 cm to 3 cm.

In the case of lenses of thickness close to 0.5 mm, the adhesive strip is positioned so that at least 1 mm of the adhesive strip projects from the concave side of the lens. Moreover, the tension applied both during deposition and maintained by the overlap following deposition enables the lens to be retained well in the packaging formed by the protective strip.

In the case of lenses 3.1 mm thick, the tension in the protective strip during deposition is not necessary to ensure retention of the lens but may nevertheless be applied.

Figure 4:
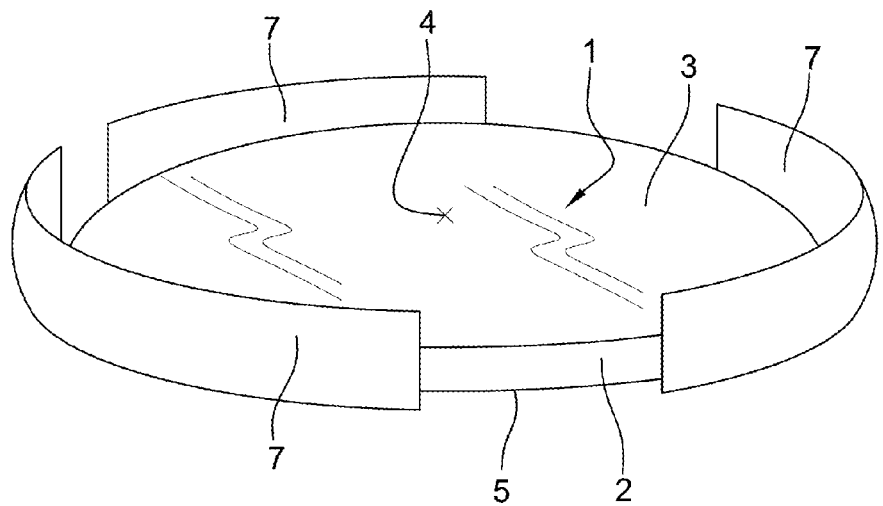
FIG. 4 is a simplified side view of an assembly according to a third embodiment of the invention consisting of a finished lens and a protective strip comprising a plurality of segments.

Referring to FIG. 4, in accordance with another embodiment of a packaging method according to the invention, the protective strip 6 may take the form of a plurality of separate segments 7 distributed around the peripheral edge 2 of the lens 1. These segments 7 are preferably equally distributed around the lens 1 so as not to leave too large a space between two successive segments 7. The total length of all the segments 7 preferably exceeds ⅔ of the total length of the peripheral edge 2 of the lens 1. In the example considered, the protective strip 6 comprises three segments 7 of equal length, distributed in a homogeneous manner around the lens 1. The maximum number of segments 7 is preferably less than eight to avoid complicating the step of gluing the protective strip 6 to the peripheral edge 2 of the lens 1.

Figure 5:
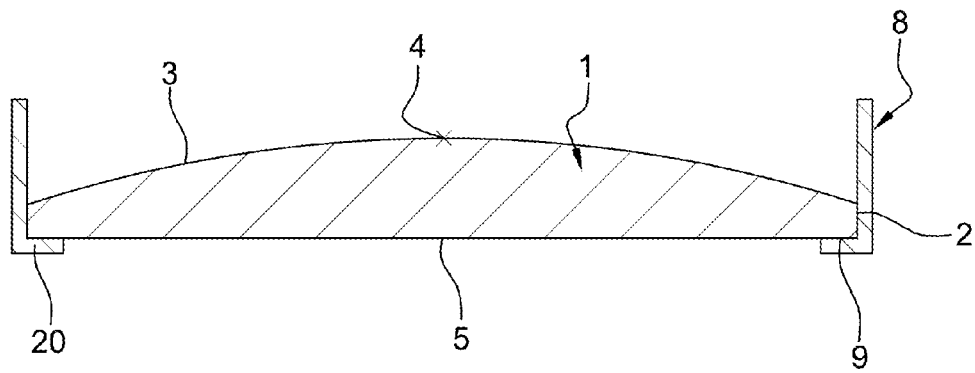
FIG. 5 is a simplified side view of an assembly according to a fourth embodiment of the invention consisting of a lens and a foam protective strip.

Referring to FIG. 5, in accordance with another embodiment of a packaging method according to the invention, the protective strip 6 may take the form of a more or less dense polymer foam 8. For this configuration, the foam 8 is applied against the peripheral edge 2 of the lens 1 and includes a plane extension 20 positioned against a peripheral zone 9 of the plane face 5 or the concave face of the lens 1. The plane extension 20 is an integral part of the foam protective strip. In this way the foam 8 is glued both to the peripheral edge 2 of the lens 1 and against the plane face 5 or the concave face of said lens 1. This foam 8 may also be made from an elastomer material, in order to confer on it elastic deformation properties. Moreover, in some embodiments there may be no adhesive material applied against the peripheral zone 9, the peripheral zone 9 being in contact only with a foam support 8 formed by the plane extension 20. The presence of the plane extension makes it possible for example to protect the sharp edge of the concave face against impact and/or to assist with the placement of the protective strip 6 around the lens.

Figure 6:
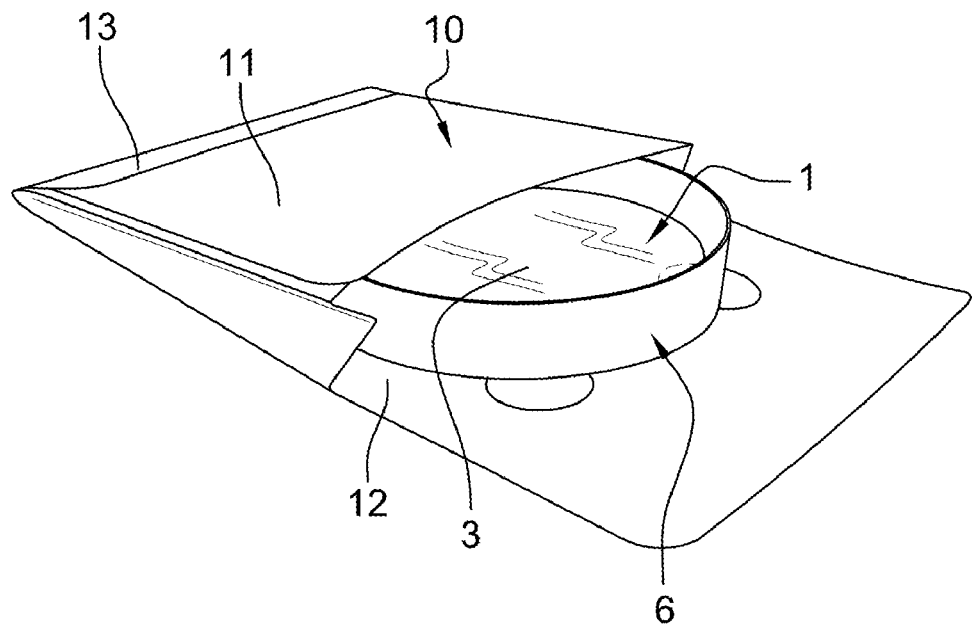
FIG. 6 is a perspective view of an assembly consisting of a lens and a protective strip during introduction into a flexible packaging sachet and illustrating one step of a packaging method according to the invention.
Figure 7:
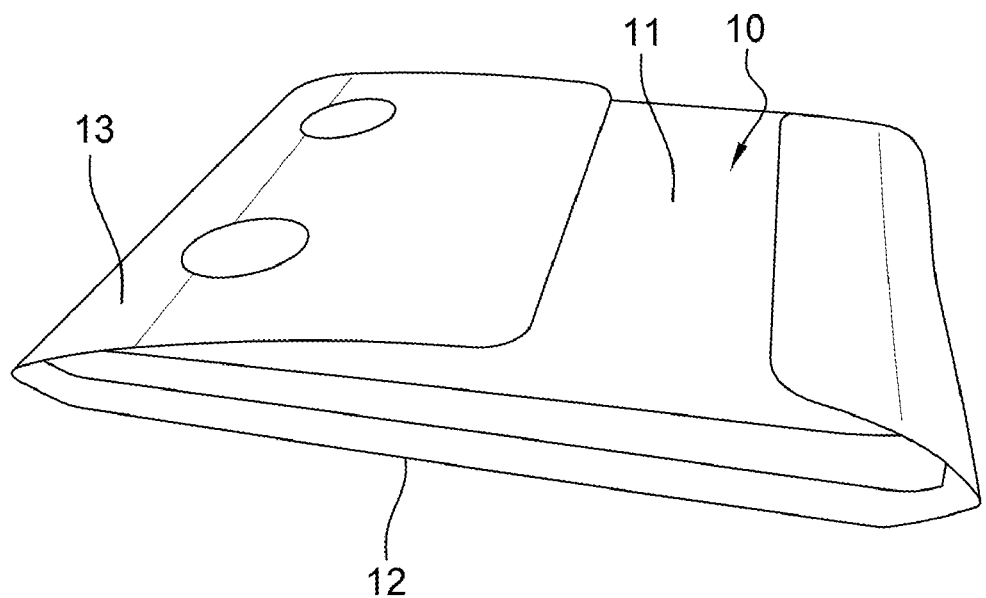
FIG. 7 is a perspective view of the sachet from FIG. 6 enclosing an assembly according to the invention, consisting of a lens and a protective strip.

Referring to FIGS. 6 and 7, a method of packaging the lens 1 comprises the following steps:
a step of manipulation of the lens 1 with the protective strip 6 attached by means of said strip 6. In this way, a person manipulating the lens 1 by means of the protective strip 6 is not liable to leave fingerprints on said lens 1 that could affect possible surface treatment of said lens 1.
a step of insertion of the lens 1 in an envelope 10 delimited by two faces 11, 12 joined to one another by a flexible connecting wall 13. These two faces 11, 12 can pivot one relative to the other by at least a few degrees around the connecting wall 13 to go from a closed position in which they are in contact with one another to a maximum open position in which they form between them a maximum angle of 30°. This envelope 10 is preferably made from a cellulose-based material such as for example paper or cardboard, said envelope 10 being partially covered by a plastic reinforcing film. This insertion of the lens 1 is effected between the two faces 11, 12 of the envelope 10 so that each of said faces 11, 12 is located facing a face 3, 5 of the lens 1. At the moment of this insertion, the two faces 11, 12 of the envelope are spread apart. In an alternative embodiment, the connecting wall 13 may feature pleats and be like a bellows able to be deployed to increase its thickness.
a step of placing said lens 1 in said envelope 10 so that the protective strip 6 prevents any contact between the flexible face 11 of the envelope 10 situated facing the convex face 3 of the lens 1 and said convex face 3. The protective strip 6 plays the role of a spacer physically separating the convex face 3 of the lens 1 and the flexible wall 11 of the envelope 10 so as to prevent any direct contact between these two elements.
a step of closing the envelope 10 enclosing the assembly consisting of the lens 1 and the protective strip 6 fastened to said lens 1. Actually, one wall 11 of said walls 11, 12 of the envelope 10 is extended relative to the other wall 12 so that it can be folded over the latter in order to close the envelope 10 enclosing the lens 1. It is to be noted that the two faces 11, 12 of the envelope can also have some flexibility and be slightly deformable.

For other envelopes, the walls 11, 12 may be adapted to move away from or toward one another by means other than rotation, for example by translation.

On completion of this packaging method, the lens 1 is placed under optimum transportation conditions.

The invention claimed is:

1. A method of packaging an optical lens including two faces and a peripheral circumferential edge, at least one convex face of said two faces having a convexity marked by a peak point, said method comprising:
depositing a rigid material protective strip along a totality of a length of said peripheral circumferential edge, a width of the strip extending beyond the peak point of the at least one convex face of the lens, two ends of the protective strip overlapping one another along the peripheral circumferential edge forming an overlap over at least 1 cm thereby providing greater mechanical strength of the strip at the overlap in relation to remaining portions of the strip other than the overlap, the protective strip being at least partially elastic, the protective strip being tensioned when the protective strip is deposited over the peripheral circumferential edge of the lens with a tension of approximately 10 kN, the two ends of the protective strip being fixed together while the protective strip is tensioned around the peripheral circumferential edge of the lens;
inserting the lens in an envelope delimited by a wall; and
placing said lens in said envelope so that the protective strip serves as a spacer in order to maintain a distance between the wall of the envelope and the at least one convex face of said lens and thus to prevent any contact between said wall and said at least one convex face.

2. The packaging method as claimed in claim 1, wherein the lens is a finished lens that can configured to be mounted on a spectacle frame with no transformation other than machining a contour of the lens.

3. The packaging method as claimed in claim 2, wherein the lens includes, on the at least one convex face, one or more of a hydrophobic coating or an oleophobic coating, a protective layer for the hydrophobic coating or the oleophobic coating, and a non-permanent ink marking configured to be removable by rubbing.

4. The packaging method as claimed in claim 1, wherein the lens includes, on the at least one convex face, one or more of a hydrophobic coating or an oleophobic coating, a protective layer for protecting the hydrophobic coating or the oleophobic coating, and a non-permanent ink marking configured to be removable by rubbing.

5. The packaging method as claimed in claim 1, wherein the width of the protective strip in contact with the peripheral circumferential edge is less than 7 mm.

6. The packaging method as claimed in claim 5, wherein the lens is one of:
   (i) a semi-finished lens configured to be reworked by machining a concave face of the two faces in order to impart a predetermined prescription and to form a finished lens, and
   (ii) a finished lens having the peripheral edge that is thicker than 5 mm in which the protective strip is not in contact with all of a width of the peripheral circumferential edge.

7. The packaging method as claimed in claim 1, wherein the protective strip includes, before deposition, a support film having an adhesive face and a second face, a peelable layer adhering to the adhesive face and being configured to be peeled off the adhesive face, the protective strip being deposited by application of the adhesive face to the lens, said peelable layer being removed at the time of deposition so that the overlap occurs directly between a portion of the adhesive face and the second face of the support film.

8. The packaging method as claimed in claim 1, wherein the protective strip extends beyond the peak point by a distance of at least 1 mm.

9. The packaging method as claimed in claim 1, further comprising marking the protective strip, the marking including information serving to characterize the lens.

10. The packaging method as claimed in claim 1, wherein the envelope has two plane faces between which the lens is inserted so that each of said plane faces is located facing one of the two faces of said lens, a positioning of the protective strip and in relation to the lens preventing one of the plane faces of the envelope that is located facing the at least one convex face of the lens from coming into contact with said at least one convex face of the lens, even when a pressure of at least 500 g or at least 1 kg is applied to the one plane face of the envelope.

11. The packaging method as claimed in claim 1, wherein a combined structure of the protective strip and the lens when the protective strip is deposited around the lens is configured to resist a load of at least 1 kg applied to a plane extending perpendicularly to a central axis of the lens.

12. The packaging method as claimed in claim 1, wherein the width of the protective strip in contact with the peripheral circumferential edge is less than 5 mm.

13. The packaging method as claimed in claim 1, wherein the two ends of the protective strip overlap forming the overlap over at least 2 cm.

14. The packaging method as claimed in claim 1, wherein the protective strip extends beyond the peak point by a distance within a range including 2 mm to 5 mm.

15. An optical lens package comprising:
    a lens comprising two faces and a peripheral circumferential edge, at least one convex face of said two faces having a convexity marked by a peak point;
    a rigid material protective strip deposited along a totality of a length of the peripheral circumferential edge of the lens, a width of the strip extending beyond the peak point of the at least one convex face of the lens, two ends of the protective strip overlapping one another along the peripheral circumferential edge forming an overlap over at least 1 cm thereby providing greater mechanical strength of the strip at the overlap in relation to remaining portions of the strip other than the overlap, the protective strip being at least partially elastic, the protective strip being tensioned with a tension of approximately 10 kN when deposited over the peripheral circumferential edge of the lens, the two ends of the protective strip being fixed together while the protective strip is tensioned around the peripheral circumferential edge of the lens; and
    an envelope delimited by a wall and comprising the lens inserted therein,
    wherein the lens is placed in said envelope so that the protective strip serves as a spacer in order to maintain a distance between the wall of the envelope and the at least one convex face of said lens to prevent any contact between said wall and said at least one convex face,
    the lens is one of (i) finished with a finished thickness, and (ii) semi-finished with a greater thickness than the finished thickness, and
    the protective strip is deposited along a totality of a width of the peripheral circumferential edge of the lens when the lens is finished and along only a portion of the width of the peripheral circumferential edge of the lens when the lens is semi-finished.

* * * * *